P. FERBER.
SURVEYING INSTRUMENT.
APPLICATION FILED FEB. 27, 1909.
975,682.
Patented Nov. 15, 1910.
2 SHEETS—SHEET 2.
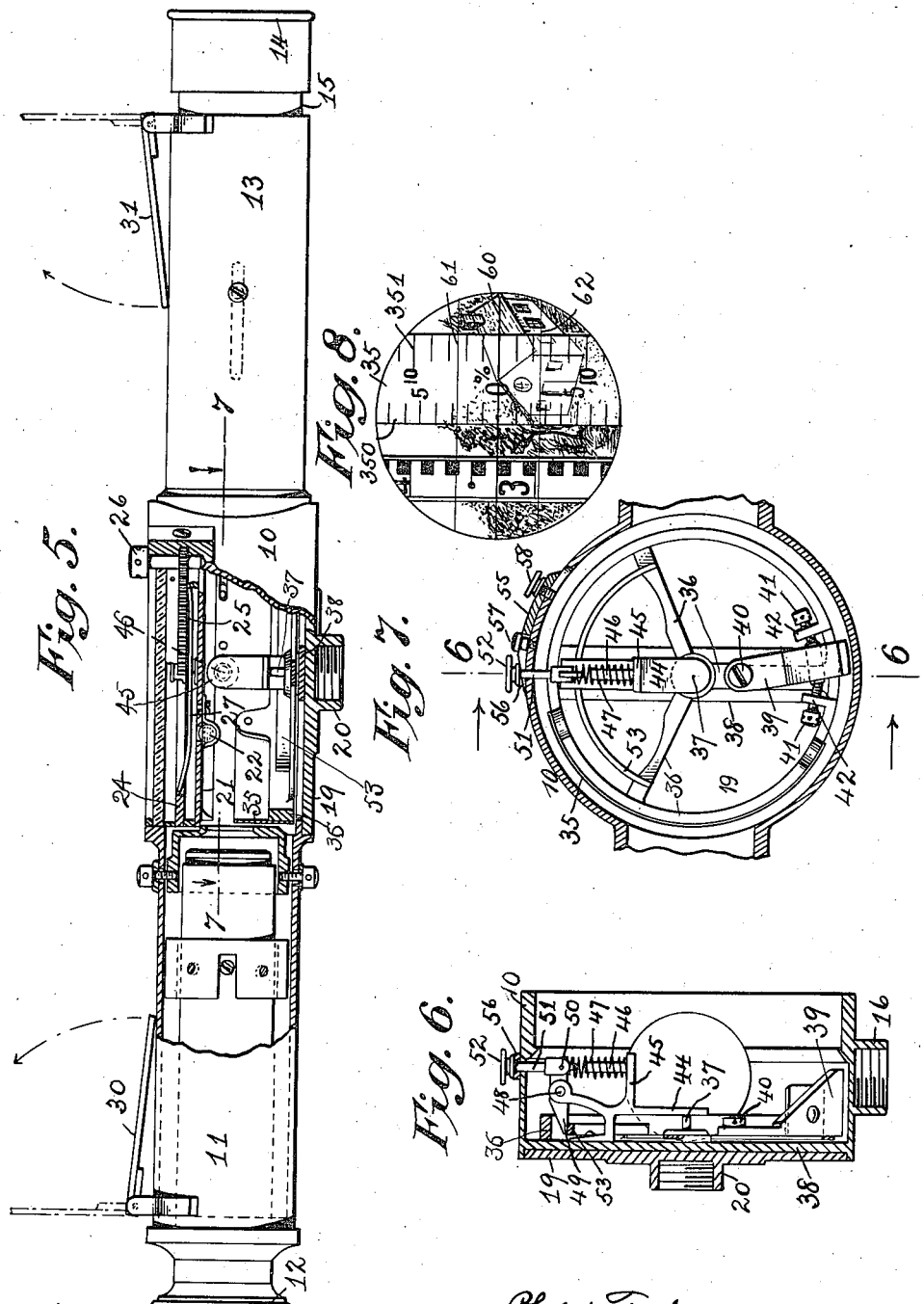
Attest:
Edgeworth Greene
Alan C. McDonnell
Philip Ferber, Inventor:
by William R. Baird
his Atty.

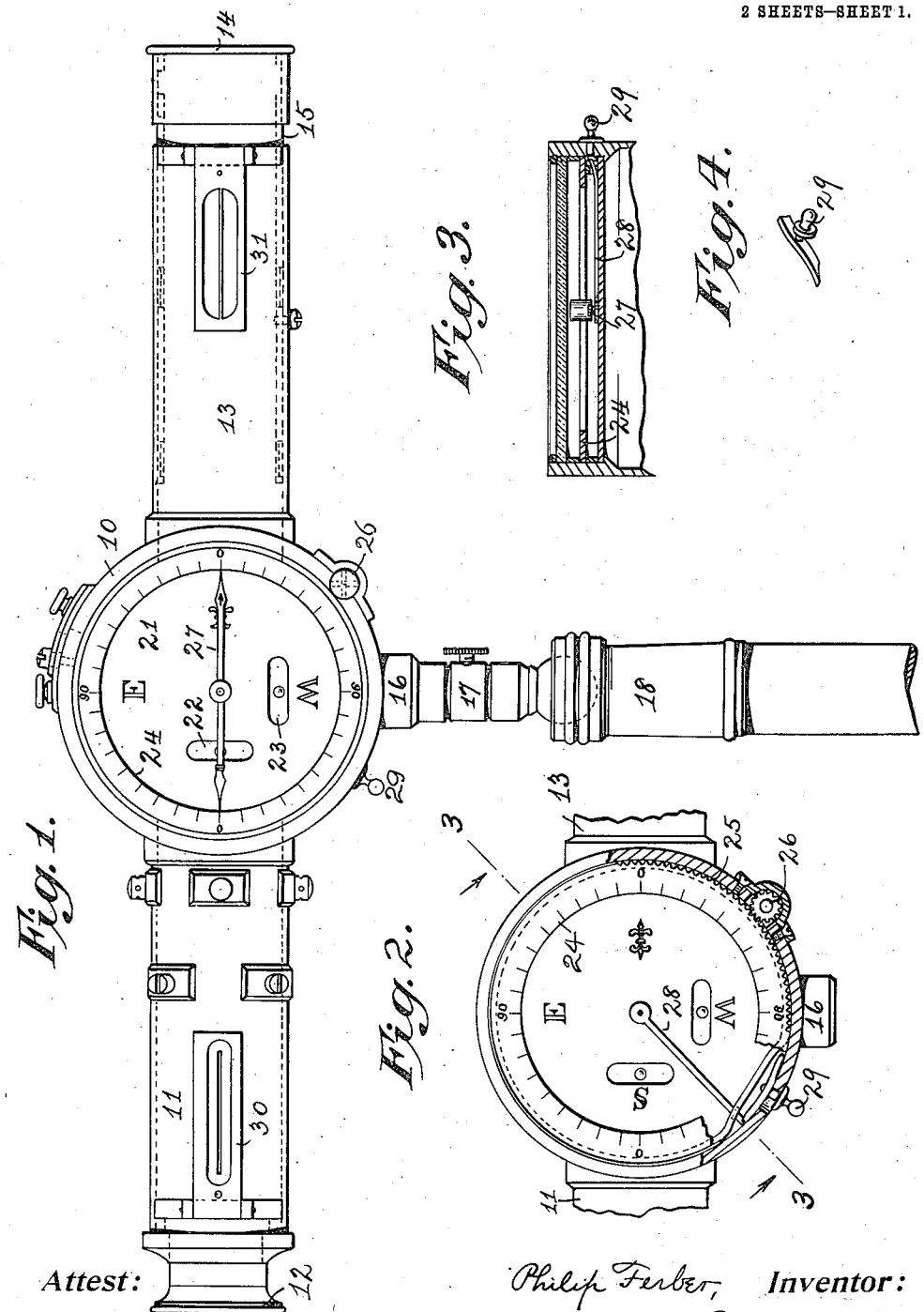

UNITED STATES PATENT OFFICE.

PHILIP FERBER, OF HOBOKEN, NEW JERSEY, ASSIGNOR TO THE KEUFFEL & ESSER COMPANY, OF HOBOKEN, NEW JERSEY, A CORPORATION OF NEW JERSEY.

SURVEYING INSTRUMENT.

975,682.  Specification of Letters Patent.  Patented Nov. 15, 1910.

Application filed February 27, 1909. Serial No. 480,404.

*To all whom it may concern:*

Be it known that I, PHILIP FERBER, a citizen of the United States, residing at Hoboken, in the county of Hudson and State of New Jersey, have invented certain new and useful Improvements in Surveying Instruments, of which the following is a specification.

This invention relates to surveying instruments and its novelty consists in the construction and adaptation of the parts as will be more fully hereinafter pointed out.

The object of the invention is to combine in one readily portable instrument facilities for measuring distances, ascertaining vertical angles and slopes and taking compass bearings, the combined angle, grade and stadia readings being read simultaneously in the same field of view. I have therefore, called this instrument a stadia hand transit.

In the drawings Figure 1 represents a side elevation of a preferred form of an instrument embodying my invention mounted on a Jacob's staff, and arranged in a position for taking clinometer readings; Fig. 2 is a side elevation of the compass side of the instrument, with part of the outer case broken away to show the means of setting off the variation and locking the magnetic needle; Fig. 3 is a transverse section on the plane of the line 3—3 in Fig. 2 the level tube beyond the section plane being omitted; Fig. 4 is a perspective detail of the needle locking lever handle; Fig. 5 is a side elevation and partial longitudinal section through the instrument when it is arranged in position for taking compass bearings; Fig. 6 is a transverse section through the clinometer casing approximately on the plane of the line 6—6 in Fig. 7; Fig. 7 is a partial transverse section on the plane of the line 7—7 in Fig. 5, and a plan view of the parts beneath that plane the staff socket being omitted; and Fig. 8 is an enlarged view of the field when stadia bearings and the slope and angle are being read from the clinometer scale.

In the drawings, 10 is a cylindrical casing made of any suitable size and opaque material and adapted to contain the clinometer scale and its related parts and provided on one side with a recess to receive the compass and its related parts.

11 is a telescopic tube secured to, or made integral with, the cylindrical casing 10 and provided at its extremity with an eye piece indicated at 12. 13 is a similar telescopic tube also secured to, or made integral with, the casing and arranged on the side opposite the eye piece and provided with an objective indicated at 14. This objective is mounted upon a sleeve 15 slidable with respect to the tube 13 whereby the instrument can be focussed. Hinged folding sights indicated at 30 and 31 are arranged on the telescopic tubes.

The casing 10 is provided with a socket thimble 16 internally threaded to receive a socket post 17 whereby it may be secured to a Jacob's staff indicated at 18, or other form of support. One side of the casing is closed by a plate 19 provided with a socket thimble 20 internally threaded to receive the same socket post 17 whereby the device may be similarly mounted on the same or another support so that its parts are all at right angles to the positions they assume when the thimble 16 is engaged with the socket 17.

On the side of the casing 10 opposite the plate 19 the compass elements are arranged. These comprise a leveling plate 21 provided with two spirit levels indicated at 22 and 23; a raised silvered ring 24 properly graduated, only a few of the coarse graduations being shown in the drawings, provided with a circumferential gear 25 and adapted to be rotated by a capstan head pinion 26 mounted in suitable bearings in the side of the casing, and a needle 27 pivoted in the center of the plate 21 in a usual manner and provided with lock lever 28 having an external handle 29 by the movement of which the needle is lifted from its pivot and locked in position.

Within the casing 10 there is arranged an arcuate clinometer scale indicated at 35 having two series of graduations, one 350 indicating vertical angles to single degrees, and the other 351 indicating slopes in feet per 100 or in centimeters per meter of the horizontal. This scale is made of translucent or transparent material for instance, celluloid, and is mounted on a cylindrical frame 36 provided with a pivot 37 mounted to oscillate in bearings in a supporting plate 38 arranged transversely of the casing. The scale frame is provided with a weight indicated at 39 and secured to the frame by a pivot 40 and adapted to be adjusted by set screws 41, mounted to rotate in brackets 42 forming part of the frame.

It is desirable that the scale should be prevented from moving when not in use and for that purpose there is provided a locking mechanism which is arranged as follows: A bracket 44 is secured to the plate 38. It is provided with an arm 45 to which is secured an upwardly extending post 46 around which is coiled a spring 47. Hinged at 48 to the bracket 44 is a shoe 49 pivoted at 50 to an upwardly extending stem 51 terminating in a finger piece 52 arranged outside of the casing. Arranged across the frame 36 is a curved strip or band 53 which passes under the shoe 49 and which is normally pressed against it by reason of the tension of the spring 47 against the lower end of the stem 51. When the finger piece 52 is depressed the spring 47 is compressed, the shoe 49 is oscillated on its hinge 48 and no longer contacts with the band 53, and the frame 36 under the influence of gravity oscillates until the center of gravity of the frame, which is controlled by the position of the weight 39, is vertically below the pivot 37. Normally the tension of the spring 47 against the lower end of the stem 51 keeps the brake shoe 49 against the band 53 and prevents the scale frame 36 from oscillating. In order to prevent the accidental depression of the finger piece 52 there is provided on the outside of the case 10 a curved plate 55 beveled at 56 and adapted to pass under the finger piece 52 to lock it. The beveled part 56 is forked to pass on each side of and under the head of a screw 57 which guides the plate and keeps it in place, and the plate is moved by its own finger piece 58.

The telescope is provided with a central cross hair 60 and two stadia hairs 61 and 62, the latter being made of different thickness or strength from the central cross hair and arranged above and below it. The stadia hairs are adjusted to read 1:100.

What I claim as new is:—

1. In an instrument of the kind described, the combination with means for viewing a distant object on a limited field, of a suitably located center wire within the instrument, and a scale adapted to be optically projected in the same field and graduated to read vertical angles in terms of degrees or slope, and means whereby there may be read in the same field an indication of the distance of the object looked at.

2. In an instrument of the kind described, the combination with means for viewing a distant object on a limited field, of a suitably located center wire within the instrument, and a scale adapted to be optically projected in the same field and graduated to read vertical angles in terms of degrees or slope, and means whereby there may be read in the same field an indication of the distance of the object looked at, consisting of stadia wires contained within the instrument.

3. In an instrument of the character described, a transparent or translucent clinometer scale graduated in terms of degrees and slope to read vertical angles, in combination with means for holding it normally rigid and means whereby it may be released when desired and assume a vertical position under the influence of gravity.

4. In an instrument of the character described, a transparent or translucent clinometer scale graduated in terms of degrees and slope to read vertical angles, in combination with a supporting frame on which the scale is mounted, means adapted normally to lock the frame against movement and means for unlocking the frame.

5. In an instrument of the character described, a transparent or translucent clinometer scale graduated in terms of degrees and slope to read vertical angles, in combination with a supporting frame on which the scale is mounted, comprising a circular scale supporting member, a weight pivotally and adjustably secured thereto and a brake band carried by the frame.

6. In an instrument of the character described, a transparent or translucent clinometer scale graduated in terms of degrees and slope to read vertical angles, in combination with a supporting frame on which the scale is mounted, comprising a circular scale supporting member, a weight pivotally and adjustably secured thereto and a brake band, and means whereby the brake band and frame are normally locked against movement.

7. In an instrument of the character described, a transparent or translucent clinometer scale graduated in terms of degrees and slope to read vertical angles, in combination with a supporting frame on which the scale is mounted, comprising a circular scale supporting member, a weight pivotally and adjustably secured thereto and a brake band carried by the frame, and means whereby the brake band and frame are normally locked against movement, consisting of a brake shoe yieldingly held against the band.

8. In an instrument of the character described, a transparent or translucent clinometer scale graduated in terms of degrees and slope to read vertical angles, in combination with a supporting frame on which the scale is mounted, comprising a circular scale supporting member, a weight secured thereto and a brake band, and means whereby the brake band and frame are normally locked against movement and other means whereby they are unlocked.

9. In an instrument of the character described, a transparent or translucent clinometer scale graduated in terms of degrees and slope to read vertical angles, in combination with a supporting frame on which the scale is mounted, comprising a circular scale supporting member, a weight secured thereto and a brake band, and means whereby the brake band and frame are normally locked against movement, consisting of a brake shoe spring held against the band, and other means whereby they are unlocked consisting of an externally projecting finger piece adapted to be pressed against the spring to relieve its tension.

10. In an instrument of the character described, a transparent or translucent clinometer scale graduated in terms of degrees and slope to read vertical angles, in combination with a supporting frame on which the scale is mounted, comprising a pivotally mounted circular scale supporting member, a weight pivotally mounted secured thereto, and means for circularly adjusting the weight on its pivot.

Witness my hand.

PHILIP FERBER.

Witnesses:
Morris W. Lee,
Bowdewine B. Van Sickle.